United States Patent
Kang et al.

(10) Patent No.: US 8,682,537 B2
(45) Date of Patent: Mar. 25, 2014

(54) POSTURE CONTROL APPARATUS FOR DRIVER

(75) Inventors: Seong Gyu Kang, Gyeonggi-do (KR); Soo Hwan Kim, Gyeonggi-do (KR); Seung Hwan Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 65 days.

(21) Appl. No.: 13/448,568

(22) Filed: Apr. 17, 2012

(65) Prior Publication Data

US 2013/0069402 A1 Mar. 21, 2013

(30) Foreign Application Priority Data

Sep. 16, 2011 (KR) .......................... 10-2011-0093162

(51) Int. Cl.
*B60R 22/00* (2006.01)
(52) U.S. Cl.
USPC .............................................. 701/49; 701/41
(58) Field of Classification Search
USPC ..................................................... 701/45, 49
See application file for complete search history.

(56) References Cited

U.S. PATENT DOCUMENTS

| | | | |
|---|---|---|---|
| 6,351,698 B1* | 2/2002 | Kubota et al. | 701/51 |
| 2004/0128065 A1* | 7/2004 | Taylor et al. | 701/201 |
| 2009/0132099 A1* | 5/2009 | Kriger | 701/1 |
| 2012/0086249 A1* | 4/2012 | Hotary et al. | 297/284.3 |
| 2012/0327232 A1* | 12/2012 | Yang et al. | 348/148 |

FOREIGN PATENT DOCUMENTS

| | | |
|---|---|---|
| JP | 2002096700 A | 4/2002 |
| JP | 2006213150 A | 8/2006 |
| KR | 1019970036390 A | 7/1997 |
| KR | U1998-066748 U | 12/1998 |
| KR | 10-2004-0029210 | 4/2004 |
| KR | 10-2010-0033624 | 3/2010 |

* cited by examiner

*Primary Examiner* — Calvin Cheung
(74) *Attorney, Agent, or Firm* — Edwards Wildman Palmer LLP; Peter F. Corless

(57) ABSTRACT

A posture control apparatus is provided. More specifically, a memory stores positional information of a seat corresponding to a sex, a stature, a sitting stature and a body type of a driver. An information collector receives the sex, the stature, the sitting stature and a weight of the driver and a sitting stature section determinator determines a sitting stature section of the driver based on the received stature and sitting stature of the driver. A Body Mass Index section determinator determines a body type section of the driver based on the received sex, stature, and weight of the driver. A controller then determines a position of the seat corresponding to the sex, the stature, the sitting stature section and the body type section of the driver based on the positional information of the seat stored in the memory.

15 Claims, 3 Drawing Sheets

POSTURE CONTROL APPARATUS FOR DRIVER

CROSS-REFERENCES TO RELATED APPLICATIONS

Priority to Korean patent application number 10-2011-0093162, filed on Sep. 16, 2011, which is incorporated by reference in its entirety, is claimed.

BACKGROUND OF THE INVENTION

1. Field of the Invention

The present invention relates to a posture control apparatus for a driver and a method thereof, and more particularly, to an Intelligent Driver Accommodation System (IDAS).

2. Description of the Related Art

Typically, in a lot of vehicle modules, drivers are forced to drive a vehicle using equipment and parts that are fixed upon installation into the vehicle by the manufacture, e.g., driver controlled steering wheels, accelerator pedals, brake pedals, clutch pedals, the rearview mirror, and side mirror for visibility of a back direction by eyes.

However, because each driver has different body size and sitting posture, the driver feels more comfortable when the equipment and parts are in a suitable position for them. Typically, in order to adjust the drivers position, a seat back, for example, may be slid in the backward or forward, a seat backrest may be adjusted to comfortable angle, and a head rest is may be adjusted in its angle and stature.

Also, angle of rearview mirror and side mirror are adjustable backward and forward, or left and right to adjust the reflection angle. Thus, the driver may also adjust the angles of the rearview mirror and side mirrors to suit their posture before commencing driving operation.

However, few drivers drive in a suitable position to his or her body requirements. In particular, there are quite a few drivers who drive the vehicle in a rigid posture because they have adjusted the seat to be up close to the steering wheel. Others drive the vehicle, practically lying down Thus, there is a need for a technique which is able to adjust the posture of a driver to a suitable manner in order to avoid harm to a driver's health. There is also a need for a technique which takes into consideration travel environments (e.g., road type, traffic situations and the like), and changes driver postures within a predetermined range, to adapt to a suitable position for specific travel environments without pressing a body of the driver.

Also, there is a further need for a technique that takes into account travel environments (e.g., road type, traffic situations and the like) and driver condition, to adapt the driver posture to be within a predefined limit, in order to provide a healthy driving environment for the driver.

SUMMARY OF THE INVENTION

The present invention has been made in view of the above problems, and provides a posture control apparatus for a driver that uses calculated seat positional information based on the sex and body information of the driver. The present invention also provides a posture control apparatus that uses calculated data of seat positional information and travel environment information based on the sex and body information of the driver. Furthermore, the present invention also provides a posture control apparatus using calculated seat positional information, travel environment information, and healthy information of the driver based on the sex and body information of the driver.

In accordance with an aspect of the present invention, a driver posture control apparatus equipped in a vehicle, the apparatus including: a memory storing positional information of a seat corresponding to a sex, a stature, a sitting stature and a body type of a driver; an information collector configured to receive the sex, the stature, the sitting stature and a weight of the driver; a sitting stature section determinator configured to determine a sitting stature section of the driver based on the received stature and sitting stature of the driver; a Body Mass Index section determinator configured to determine a body type section of the driver based on the received sex, stature, and weight of the driver; and a controller configured to determine a position of the seat corresponding to the sex, the stature, the sitting stature section and the body type section of the driver based on the positional information of the seat stored in the memory.

In accordance with another aspect of the present invention, a driver posture control apparatus equipped in a vehicle includes: a memory configured to store positional information of a seat corresponding to a sex, a stature, a sitting stature and a body type of a driver; an information collector configured to receive the sex, the stature, the sitting stature and a weight of the driver; a sitting stature section determinator configured to determine a sitting stature section of the driver based on the received stature and sitting stature of the driver; a Body Mass Index section determinator configured to determine a body type section of the driver based on the received sex, stature, and weight of the driver; a data collector configured to collect travel environment information; and a controller configured to determine a position of the seat corresponding to the sex, the stature, the sitting stature, and the body section based on the positional information of the seat stored in the memory, and including the travel environment information collected by data collector in determining the position of the seat to determine a final position and height of the seat.

In accordance with another aspect of the present invention, a driver posture control apparatus equipped in a vehicle includes: a memory configured to store positional information of a seat corresponding to a sex, a stature, a sitting stature and a body type of a driver; an information collector configured to receive the sex, the stature, the sitting stature and a weight of the driver; a sitting stature section determinator configured to determine a sitting stature section of the driver based on the received stature and sitting stature of the driver; a Body Mass Index section determinator configured to determine a body type section of the driver based on the received sex, stature, and weight of the driver; a data collector configured to collect vehicle type information and healthy information; and a controller configured to determine a position of the seat corresponding to the sex, the stature, the sitting stature, and the body section based on the positional information of the seat stored in the memory and the travel environment information collected by data collector to determine a final position and height of the seat, and utilizing health information to determine an angel of backrest.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
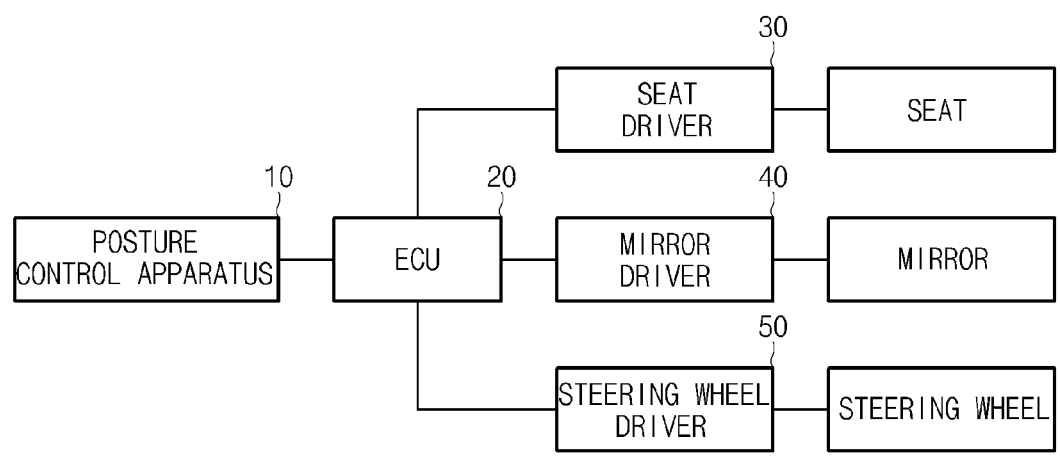
FIG. 1 is a block diagram illustrating a configuration of a posture control apparatus of a driver according to an exemplary embodiment of the present invention.

FIG. 1 is a block diagram illustrating a configuration of a posture control system of a driver according to an exemplary embodiment of the present invention. As herein, Electronic Control Units (ECU) of the vehicle refers to a control unit or controller for controlling a seat, mirror and/or steering wheel of a vehicle. However, the present invention is not limited thereto. Referring to FIG. 1, a posture control system includes a posture control apparatus 10, an ECU 20, a seat driver 30, a mirror driver 40, and a steering wheel driver 50.

The following is a description of respective structural elements. A posture control apparatus 10 controls a seat driver 30, a mirror driver 40 and a steering wheel driver 50 through the ECU 20 to determine a seat position utilizing seat positional information calculated based on the sex and body information of the driver, to determine the locations of a mirror and a steering wheel corresponding to the seat position thereof. In this case, the position of the mirror and steering wheel, and the seat stature and seatback angle according to the seat position are equipped in a form of table through pre-testing procedures.

The posture control apparatus 10 may control the seat driver 30, the mirror driver 40 and the steering wheel driver 50 through ECU 20 to determine the final seat position by including travel environment information in the calculated positional information of the seat based on the sex and body information of the driver, and to determine the locations of a mirror and steering wheel corresponding to the seat position thereof.

Further, the posture control apparatus 10 may control the seat driver 30, the mirror driver 40 and the steering wheel driver 50 through the ECU 20 to determine the final seat position by including travel environment information and health information of the driver to determine the seat positional information calculated based on the sex and body information of the driver, and to determine the location of a mirror and steering wheel corresponding to the seat position thereof.

In the illustrative embodiment of the present invention, ECU 20 is an electronic control device that is configured to control all electronic devices of the vehicle. The ECU 20 controls drive of relevant electronic devices based on control values obtained from the posture control apparatus 10, which are transmitted through, e.g., a Controller Area Network (CAN) communication, Local Interconnect Network (LIN) communication and/or Flexray communication.

For example, ECU 20 controls the seat driver 30 to regulate seat statures and seatback angles according to first to n-th control data/value A. The 'A' in this exemplary embodiment of the present invention means a control value that drives the seat driver 30. The ECU 20 controls the mirror driver 40 to adjust the angles of rearview, left and right mirrors according to first or n-th control data/value B. The 'B' in this exemplary embodiment of the present invention means a control value that drives the mirror driver 40.

Further, the ECU 20 controls the steering wheel driver 50 to adjust the length and an angle of a support shaft in steering wheel based on a first to n-th control data/value C. The 'C' in this exemplary embodiment of the present invention means a control value that drives the steering wheel driver 50.

Figure 2:
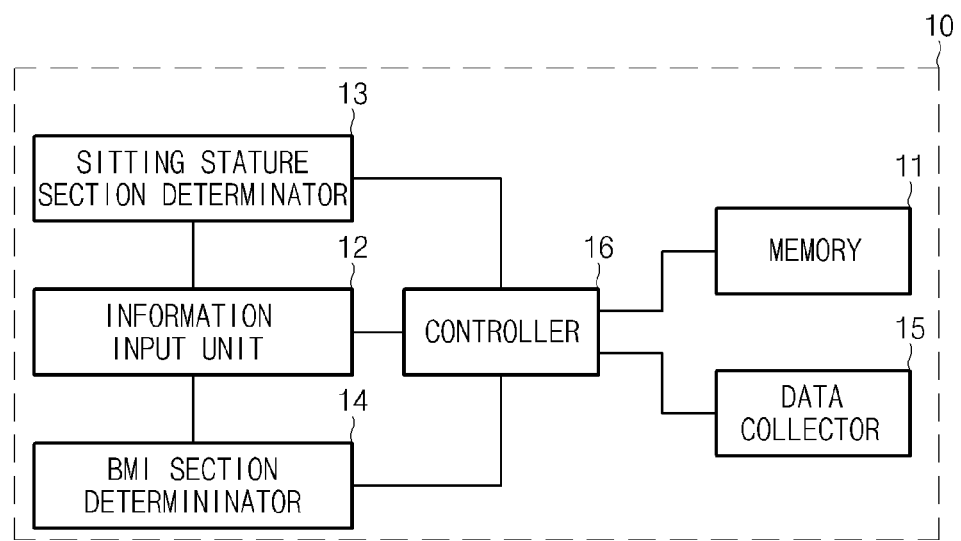
FIG. 2 is a block diagram illustrating a configuration of a posture control apparatus according to an exemplary embodiment of the present invention.

FIG. 2 is a block diagram illustrating a configuration of a posture control apparatus of a driver. Referring to FIG. 2, the intelligent driver posture system unit 10 includes a memory 11, an information input unit 12, a sitting stature section determininator 13, a body section determininator 14, a data collector 15, and a controller 16.

Figure 3:
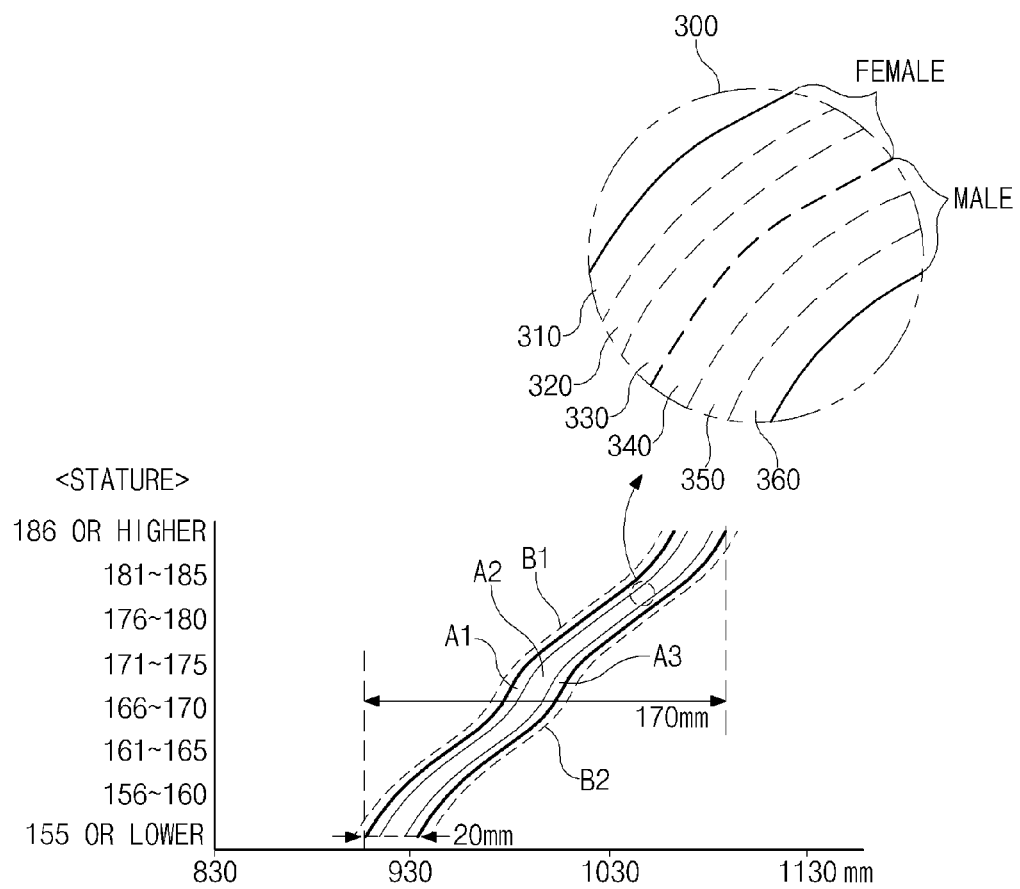
FIG. 3 is a graph illustrating a position section of a seat according to a sex and body information of a driver according to an exemplary embodiment of the present invention.

The following is a description of respective structural elements. First, memory 11 is configured to store graphs indicating a seat position according to a driver's sex, stature, sitting stature and Body Mass Index (BMI). That is, the memory 11 stores information (e.g., graphs) of a linear distance from a center of brake pedal or accelerate pedal to an intersection of the seat and seat back as a location of a seat according to a sitting stature section and a Body Mass Index (BMI) for deriving the sex, a stature, and a leg length as shown in FIG. 3. The graph is generated elaborately by applying sex, stature, sitting stature, BMI of the driver cross-organically, and it can be seen that it has a high degree of accuracy.

Moreover, the memory 11 stores the table in which position of the mirror and steering wheel according to the seat position is recorded. Next, the information input unit 12 receives information relating to the sex, stature, sitting stature and weight of the driver from the driver of vehicle. At this time, a guidance screen for inputting information is provided to the driver on the screen display unit (not shown) by the controller 16. For example, a male/female select button for receiving the sex of the driver is provided to receive driver's sex, and to directly receive a stature, a sitting stature and a weight of the driver via numerical values.

Next, a sitting stature section determinator 13 determines a sitting stature section of a driver based on a result value obtained by dividing the received sitting stature of a driver by the driver's stature. A sitting stature section is the section for estimating the length of the driver legs herein, for instance, it is categorized such as section A1 (e.g., greater than 0.551 m), section A2 (0.550 m~0.521 m) and section A3 (less than 0.520 m). A detailed explanation thereof will be described with reference to FIG. 3 below.

Next, a BMI section determinator 14 determines a section of the driver's BMI based on the sex, stature and weight that was received through information input unit 12. In other words, the BMI section determinator 14 classifies a BMI section into three sections including for example, an obesity section (e.g., a BMI greater than 24), a normal section (e.g., a BMI of between 18.5 to 24), and skinny section (e.g., a BMI less than 18.5) in case of male and female driver. A more detailed explanation thereof will be given in FIG. 3 below. The method of calculated the BMI is expressed by Equation 1.

$$BMI = weight/stature^2 \qquad \text{Equation 1}$$

where, the weight unit is in kilograms and the stature unit is in meters. Subsequently, the data collector 15 collects information related to vehicle type, driving conditions and driver condition. The data collector 15 may collect this information of vehicle type through CAN communication, LIN communication and/or Flexray communication.

Also, the data collection unit 15 may collect road information and traffic information corresponding to a current location in conjunction with a navigation system of the vehicle or through mobile communication or wireless LAN communication system (WIBRO, WIFI etc.), an external server (e.g., Mozen server). Road information may include highways, streets, routes and rural roads, and driving information may include information relating to driving conditions such as congestion information, or weather (e.g., congested sections 10 km ahead).

Also, the data collector 15 may collect information about a driver's health condition from an external server (e.g., Mozen server) through mobile communication or wireless LAN communication system (WIBRO, WIFI etc.). The Mozen server can manage information on driver's health condition directly from the driver, or from the patient management server of hospitals with the consent of the driver. In addition, the health information is driving-related health information, for example, whether the driver has a herniated disk.

Next, controller 16 determines the seat position using the seat positional information according to driver's sex and body information. The controller 16 sets the position of mirrors and steering wheels corresponding to the determined seat position hereinabove.

The controller 16 detects the seat position corresponding to the sex and a stature of the driver that is received from driver through the information input unit 12; a sitting stature section determined by the sitting stature section determinator 13; and the driver BMI section determined by the BMI section determinator 14 based on the graph according to the driver's sex and body information that is stored in memory 11. For example, when a female driver with 168 cm stature, 75 cm sitting stature, and 48 Kg weight is analyzed, she comes under a category of skinny section 330, BMI 7. Therefore, an average value in a location section of a seat suited to this driver condition is determined as a location of the seat. For example, if the seat position section is between 950 mm and 970 mm, the seat position is 960 mm.

The controller 16 also includes travel environment information which is also taken into account when determining a location of the seat to determine the final position of the seat, and sets a height of the seat corresponding to the determined location of the seat based upon the above criteria.

That is, the controller 16 detects the sex and the stature of the driver input from the information input unit 12, the sitting stature section of the driver determined from the sitting key section determinator 13, and a location of the seat corresponding to a body type section of the driver determined by the body type section determinator 14 based on a graph organized according to the sex and the body information of the driver stored in the memory 11, and includes the travel environment information collected by the information collector 15 in the detected location of the seat to determine a final location of the seat, and accordingly sets a height of the seat based thereon.

For example, when the vehicle is located in a congested area, the controller 16 moves the seat position a predetermined distance forward (e.g., 9 mm), and raises the seat height as accordingly (e.g., 15 mm). What classifies as a congested area is variably applicable. For example, if driving speed is less than 30 km per an hour on a road, the controller 16 determines the area to be a congested area; if it is less than 40 km per an hour in motorways with speed limit of 80 km per an hour, it determines as a congested area; if it is less than 50 km on highways with speed limit of 100 km per hour, it may also be determined to be a congested area.

The reason for moving the seat position forward (i.e. toward the steering wheel) and raising the seat stature in the congested area is because drivers often spend less time looking in the forward direction in lower speed areas. That is, because vehicles are often moving in front and behind, or left and right and l drivers are often looking in these alternate directions more often, normally the driver would adjust the seat position and height to aide them in their visibility.

Moreover, the controller 16 may include travel environment information and/or health information to determine a final position, angle and height of the seat.

That is, the controller 16 detects the seat position corresponding to a sex and a stature of the driver that is received from driver through the information input unit 12; a sitting stature section determined by the sitting stature section determinator 13; and the driver BMI section determined by the BMI section determinator 14 based on the graph according to driver's sex and body information that is stored in memory 11, and then incorporates the travel environment information collected by the information collector 15 therein to determine a final location and height of the seat. Furthermore, the exemplary embodiment of the present invention may also incorporate the driver's health information collected by the information collector 15 therein to determine an angle of backrest.

For example, if a driver has herniated disk, it moves the backrest forward to a predetermined angle and narrows the angle between upper and lower body. The angle of backrest satisfies "obesity condition>normal condition>skinny condition" according to driver's body contour. It is generally not comfortable for a driver that has herniated disk to stretch his back. This is because the disk presses the nerve when the vertebra is stretched. The angle of backrest is regulated in order to improve the driving experience of herniated disk patients.

Additionally, when a driver has cardiovascular diseases (hypertension, myocardial infarction, angina, etc.), the controller is configured to move the seat proportionally backward at predetermined angle and widens the angle between lower and upper body.

FIG. 3 is a graph illustrating a method for indicating the section of seat position according to the driver's sex and body information. FIG. 3 represents the driver's stature along the x-axis and the linear distance from a center of brake pedal to an intersection of the seat and backrest. A1 indicates the section, in which the driver resides (according to stature), who has the value (e.g., ratio of sitting stature to stature) divided stature by sitting stature is over 0.551; A2 indicates the section where the driver belongs to, who has the value divided stature by sitting stature is between 0.521 and 0.550; and A3 indicates the section, where the driver belongs to, who has the value divided stature by sitting stature is less than 0.520.

Each section is represented in "300". The female section is disposed on the left side of the center line (i.e., the bold dashed line) and the right side of the center line represents the male section. The female section and male section are divided further into three sections. That is, the female section includes an obesity section 310, a normal section 320 and a skinny section 330, and so does male section. It is desirable to split equally between normal section and skinny section; however, it can be divided into different sections based on a weighted split ratio.

As an example, the horizontal axis of the linear distance between 310 and 360 is 20 mm; and 170 mm the difference between the minimum and maximum value of the linear distance from the center of brake pedal to the intersection of the seat and backrest. As a result, sections A1, A2 and A3 have a "300" structure. B1 and B2 refer to the limit.

As described above, the present invention controls a posture of a driver using positional information of a seat calculated based on the sex and body information of a driver that allows a driver to have a suitable healthy driving posture. Further, the present invention also takes into account travel environment information and health information to determine a final accurate position for the driver.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A driver posture control apparatus equipped in a vehicle, the apparatus comprising:
    a memory storing positional information of a seat corresponding to a sex, a stature, a sitting stature and a body type of a driver;
    an information collector receiving the sex, the stature, the sitting stature and a weight of the driver;
    a sitting stature section determinator configured to determine a sitting stature section of the driver based on the received stature and sitting stature of the driver;
    a Body Mass Index section determinator configured to determine a body type section of the driver based on the received sex, stature, and weight of the driver; and
    a controller configured to determine a position of the seat corresponding to the sex, the stature, the sitting stature section and the body type section of the driver based on the positional information of the seat stored in the memory.

2. The apparatus of claim 1, wherein the position of the seat is a linear distance from a center of a brake pedal of the vehicle to an intersection between the seat and a seat back.

3. The apparatus of claim 2, wherein the seat position is expressed by a predetermined section.

4. The apparatus of claim 1, wherein the sitting stature section determinator is configured to determine a section of the sitting stature corresponding to the driver based on a value obtained by dividing the received sitting stature of the driver by the stature of the driver.

5. The apparatus of any one of claim 1, wherein the controller determines the position of the seat corresponding to the sex, the stature, the sitting stature section, and the body section based on the positional information of the seat stored in the memory, and then sets a location of a mirror and a location of a steering wheel corresponding to the determined position of the seat.

6. A driver posture control apparatus equipped in a vehicle, the apparatus comprising:
    a memory storing positional information of a seat corresponding to a sex, a stature, a sitting stature and a body type of a driver;
    an information collector configured to receive the sex, the stature, the sitting stature and a weight of the driver;
    a sitting stature section determinator configured to determine a sitting stature section of the driver based on the received stature and sitting stature of the driver;
    a Body Mass Index section determinator configured to determine a body type section of the driver based on the received sex, stature, and weight of the driver;
    a data collector configured to collect travel environment information; and
    a controller configured to determine a position of a seat corresponding to the sex, the stature, the sitting stature, and the body section of the driver based on the positional information of the seat stored in the memory and the travel environment information collected by data collector in the position of the seat to determine a final position and height of the seat.

7. The apparatus of claim 6, wherein the position of the seat is a linear distance from a center of a brake pedal of the vehicle to an intersection between the seat and a seat back.

8. The apparatus of claim 7, wherein the seat position is expressed by a predetermined section.

9. The apparatus of claim 6, wherein the sitting stature section determinator determines a section of the sitting stature of the driver based on a value obtained by dividing the received sitting stature of the driver the driver's stature.

10. The apparatus of any one of claim 6, wherein the controller moves the position of the seat by a first reference value and increases a stature of the seat by a second reference value when the vehicle is located in a congested area.

11. A driver posture control apparatus equipped in a vehicle, the apparatus comprising:
    a memory storing positional information of a seat corresponding to a sex, a stature, a sitting stature and a body type of a driver;
    an information collector configured to receive the sex, the stature, the sitting stature and a weight of the driver;
    a sitting stature section determinator determining a sitting stature section of the driver based on the received stature and sitting stature of the driver;
    a Body Mass Index section determinator configured to determine a body type section of the driver based on the received sex, stature, and weight of the driver;
    a data collector configured to collect vehicle type information and health information related to the driver; and
    a controller configured to determine a position of a seat corresponding to the driver's sex, stature, sitting stature, and body section based on the positional information of the seat stored in the memory, the travel environment information collected by data collector, and the health information to determine a final position and height of the seat and an angle of backrest.

12. The apparatus of claim 11, wherein the position of the seat is a linear distance from a center of a brake pedal of the vehicle to an intersection between the seat and a seat back.

13. The apparatus of claim 12, wherein the seat position is expressed by a predetermined section.

14. The apparatus of claim 11, wherein the sitting stature section determinator determines a section of the sitting stature of the driver based on a value obtained by dividing the received sitting stature of the driver by the stature of the driver.

15. The apparatus of any one of claim 11, wherein the controller moves the position of the seat by a first reference value and increases a height of the seat by a second reference value.

* * * * *